United States Patent
Ort

[15] 3,670,635
[45] June 20, 1972

[54] AUTOMATIC SHUTTER-SPEED CONTROL

[72] Inventor: Wolfgang Ort, Stuttgart-Bad Cannstatt, Germany

[73] Assignee: Eastman Kodak Company, Rochester, N.Y.

[22] Filed: June 8, 1970

[21] Appl. No.: 44,394

[30] Foreign Application Priority Data

June 6, 1969  Germany.....................P 19 28 877.8

[52] U.S. Cl............................95/10 C, 95/10 CT, 95/53 EB
[51] Int. Cl..........................................G03b 7/08, G03b 9/58
[58] Field of Search................95/10 C, 10 CE, 10 CT, 53 R, 95/53 E, 53 EB

[56] References Cited

UNITED STATES PATENTS 3,326,103  6/1967  Topaz...............................95/10 CT

*Primary Examiner*—Joseph F. Peters, Jr.
*Attorney*—Robert W. Hampton and William F. Delaney, Jr.

[57] ABSTRACT

In a camera having a photoelectric system for establishing shutter speed, means are provided for detecting the presence of a predetermined condition in the photoelectric control system and for establishing a predetermined exposure interval independently of the photoelectric control system in response to the detection of such a predetermined condition. In the preferred embodiment, the photoelectric control system includes a time-delay circuit energizable by a battery in a receptacle, and the camera includes a mechanical shutter control having a predetermined speed which is actuated in response to detection by a sensing arm of the absence of a battery in a battery receptacle.

5 Claims, 1 Drawing Figure

PATENTED JUN 20 1972
3,670,635
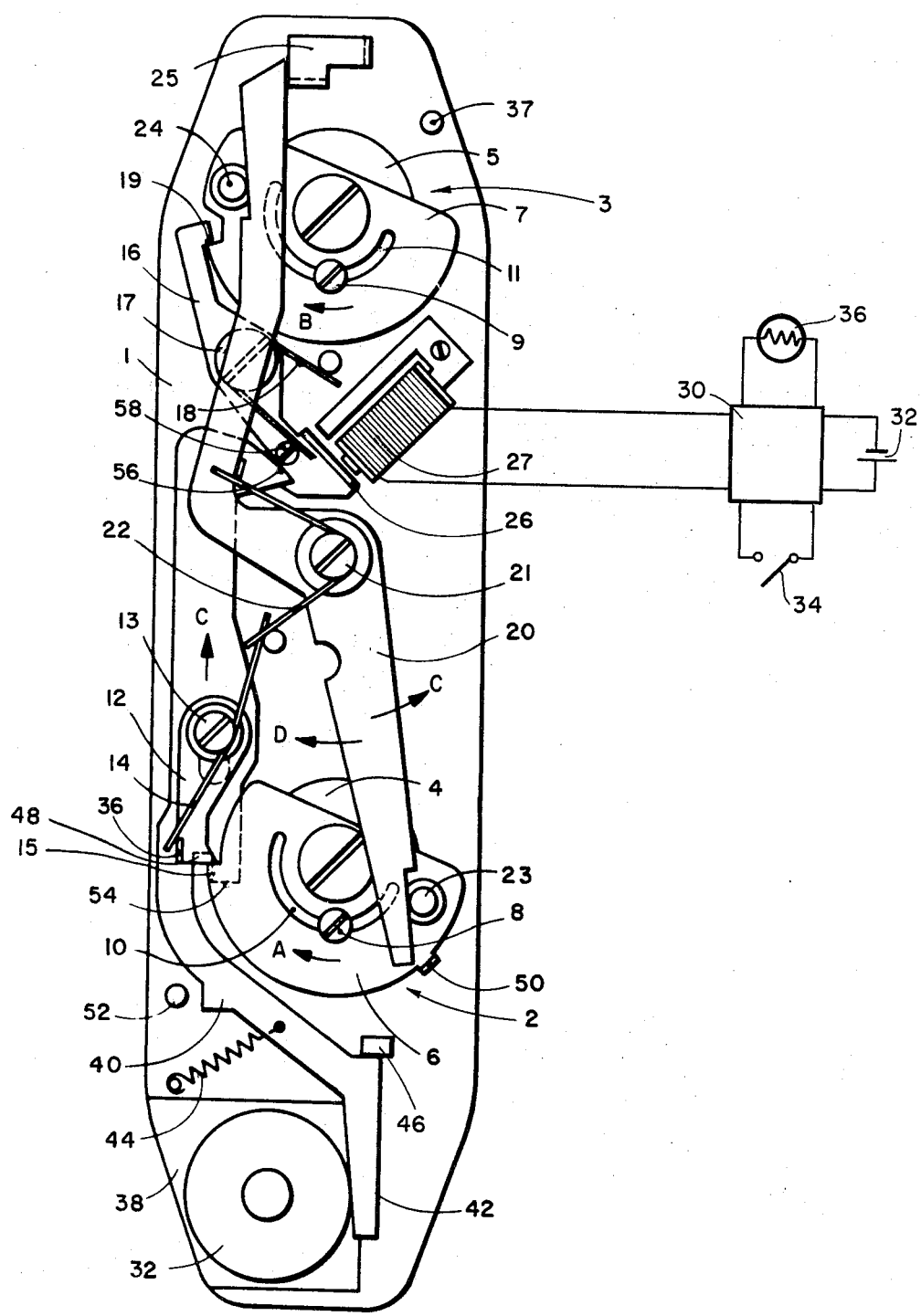
WOLFGANG ORT
INVENTOR.
BY William F. Delaney Jr.
Robert W Hampton
ATTORNEYS

AUTOMATIC SHUTTER-SPEED CONTROL

BACKGROUND OF THE INVENTION

This invention relates to exposure controls for use in a photographic apparatus, such as cameras, and more particularly to a shutter control system including a photoelectric circuit for establishing shutter speed automatically in accordance with the level of scene illumination.

There are numerous prior art exposure control systems for establishing shutter speed as a function of the level of scene illumination. Originally such devices were of the programmed shutter type in which a shutter mechanism was adjusted prior to an exposure in accordance with the level of scene light immediately prior to the exposure. More recently, however, exposure control devices have been provided which include a photoelectric time-delay circuit that integrates scene light during an exposure interval to terminate the exposure interval a period of time after its initiation as a function of scene illumination. Typically the timing circuit in such exposure control devices is actuated in synchronization with the opening of the shutter, and the circuit then actuates the shutter mechanism to close the shutter a period of time thereafter in accordance with the level of scene illumination received during the exposure interval. Such devices usually include an electromagnetic transducer that actuates the shutter mechanism to close the shutter in response to a signal from a trigger circuit associated with an integrating circuit comprising a photocell in series with an integrating capacitor. The capacitor is charged through the photocell at a rate determined by the resistance value of the photocell until the voltage across the capacitor reaches a predetermined value at which the trigger circuit is actuated to energize or deenergize a solenoid to actuate the shutter mechanism to terminate the exposure interval.

Of course, such shutter control circuits usually are energized by one or more batteries which are accommodated in a receptacle in the camera. In such cameras the condition of the battery is critical to the satisfactory operation of the electrically timed shutter, and therefore such cameras often are provided with a battery tester that provides an indication to a camera operator of the condition of the battery, such as for example described in German DAS 1,284,278 (57a-32/05). However, when the battery is not in operating condition, the camera usually is rendered inoperative until it is provided with an operative battery. Such arrangements reduce the utility of the camera, since instances may occur in which an operative battery is not immediately or readily available.

SUMMARY OF THE INVENTION

It is an object of this invention to provide a camera having a photoelectric shutter-control system with means for automatically establishing a predetermined shutter speed independently of the photoelectric system in response to a sensed condition within the photoelectric system.

It is another of this invention to provide such an independent control in such a camera that establishes a predetermined shutter speed when the photoelectric shutter-control system is rendered inoperative.

It is a further object of this invention to provide a camera having a photoelectric shutter-control system energizable by a battery in a receptacle in the camera with mechanical shutter control for establishing a predetermined speed when there is no battery in the receptacle.

These objects are accomplished according to the present invention in a camera having a photoelectric shutter-control circuit by an independent control apparatus comprising means actuatable for establishing a predetermined shutter speed independently of the photoelectric shutter control system, means for sensing a predetermined condition within the control system and means associated with the sensing means for actuating the independent shutter-speed control when the sensor detects the predetermined condition. Preferably, the sensing means is adapted to detect whether the photoelectric shutter-control system is energized, so that the independent control system is actuated when the photoelectric system is not energized.

In the preferred embodiment of the invention, the photoelectric shutter-control system includes a battery energizable time-delay circuit which establishes the length of an exposure interval as a function of the level of scene illumination, and the independent control apparatus is adapted to be actuated in response to detection that the photoelectric control system is not energized by a battery. Preferably, the sensing means comprises a sensing member extending into a battery receptacle in the camera, and the member is associated with means for actuating the independent shutter control when there is no battery in the receptacle.

In the preferred embodiment such an apparatus comprises a coupling member having an arm extending into the battery receptacle and disposed for movement from an inoperative position in which it engages a battery in the receptacle to an operative position when no battery is in the receptacle in which it is actuatable by a shutter opening mechanism to actuate a shutter closing mechanism to terminate an exposure interval after a predetermined time. Thus, when the photoelectric shutter control system is rendered ineffective due to insufficient battery power, the camera operator can remove the battery from the camera to automatically actuate the independent control to mechanically establish a predetermined shutter speed. The mechanically established shutter speed is determined by the inherent speed of the shutter mechanism, which can be adapted to provide any desired speed, such as for example 1/60 sec., at which the camera is adapted for use with a flash unit.

BRIEF DESCRIPTION OF THE DRAWING

The drawing shows an elevated view of a focal plane shutter mechanism having an independent shutter-speed control according to the preferred embodiment of this invention.

DETAILED DESCRIPTION OF THE INVENTION

Although this invention can be employed with several different types of presently known shutter systems, the preferred embodiment of the invention, as described herein, is employed in a camera 1 of the type having a focal plane shutter including an opening shutter mechanism 2 and a closing shutter mechanism 3, which control the movement of a leading shutter curtain 4 and a trailing shutter curtain 5, respectively. Only a portion of each of these shutter curtains is shown to indicate their relationship with the respective shutter mechanisms. The focal plane or film plane is not shown, and the portions of the shutter curtain extending across the film plane is not shown, since such arrangements are well known. The opening and closing shutter mechanisms each include a rotatable plate 6 and 7, respectively, which are biased by springs (not shown) in a clockwise direction as indicated by the arrows A and B, respectively. The shutter curtains are attached to their respective rotatable plates by screws 8 and 9 in arcuate recesses 10 and 11, respectively. As shown in the drawing, the shutter is in its tensioned or "cocked" condition with the rotatable plate of the "open" shutter mechanism retained against its spring bias by a retaining latch 12 rotatably mounted on a pivot pin 13 and biased by a spring 14 into engagement with a notch 15 in the plate 6, and with the rotatable plate 7 of the "closed" shutter mechanism retained by a latch 16 rotatably mounted on a pivot pin 17 and biased by a spring 18 into engagement with a notch 19 in the plate 7. The plates 6 and 7 are moved to this tensioned position by a cocking lever 20 which is rotatable counterclockwise about a pivot 21 in the direction of arrow C against the bias of a spring 22 to move the plates to the positions shown by engagement with pins 23 and 24 on plates 6 and 7 respectively. The cocking lever 20 is retained in this tensioned position by engagement with a release member 25 which is actuatable from the exterior of the camera by an operator to release the cocking lever for rotation in a clockwise direction as indicated by the arrow C under the influence of the spring 22.

The latch 16 is associated with an armature 26 positioned adjacent an electromagnetic coil 27 so that energization of the coil will attract the armature 26 to rotate latch 16 counterclockwise against the bias of the spring 18 out of retaining engagement with the rotatable plate 7 of the "closed" shutter mechanism.

The electromagnetic coil 27 is electrically connected with an electronic time-delay circuit, indicated by block 30, which is energizable by a battery 32 and is adapted to energize the coil a period of time after the circuit is actuated by the closing of a control switch 34, which period of time is established by the control circuit as a function of the level of illumination incident on a photoelectric member 36. The switch 34 can be associated with the shutter opening mechanism in any desired manner, such that the switch 34 is automatically closed to actuate the time-delay circuit 30 simultaneously with the initiation of an exposure interval. There are numerous time-delay circuits in the prior art which can be employed in this shutter control system, so that further description of the circuit is not considered necessary.

The above-described shutter system operates under the control of the photoelectric control system in the following manner. When an operator actuates the release lever 25, it is disengaged from the cocking lever 20 to permit the cocking lever to rotate in a clockwise direction as indicated by arrow D out of engagement with the pins 23 and 24 until it engages a detent 36 on the latch 12 to disengage the latch from the plate 6, immediately prior to engagement with a stop member 37. The plate 6 is free to rotate in the direction A to cause the leading shutter curtain 4 to travel across the film plane and initiate an exposure interval. At the same time the switch 34 is closed in response to actuation of the shutter opening mechanism to actuate the time-delay circuit 30 which subsequently energizes the electromagnet 27 after a period of time established as a function of the level of illumination incident on the photocell 36. When the electromagnet is energized it attracts the armature 26 to disengage the latch 16 from the rotatable plate 7 of the shutter closing mechanism. Thus, the shutter closing mechanism is caused to terminate the exposure interval in response to energization of the electromagnet 22, so that the exposure interval is determined by the timing circuit 30. However, if the battery 32 energizing the circuit 30 is not in operative condition, the electromagnet 27 would not be energized to terminate the exposure interval, and the shutter would remain open indefinitely.

To avoid rendering the camera inoperative when an operative battery is not available, a camera according to the preferred embodiment of this invention is provided with a mechanism for automatically actuating the shutter closing mechanism a predetermined period of time after actuation of the shutter opening mechanism when a battery receptacle 38 does not contain a battery. This mechanism includes a coupling lever 40 pivotally and slidably mounted on the pin 13 with an extension arm 42 that extends into the battery receptacle 38. When a battery is in the receptacle it is engaged by the arm 40 which is moved thereby against the bias of a spring 44 into engagement with a stop member 46, in which position a notch 48 defined by the coupling lever 40 is aligned with the path of movement of a detent 50 on the rotatable plate 6 so that the coupling member is disabled. However, if no battery is in the compartment 38 the coupling lever is moved by its spring bias into engagement with a second stop member 52, in which position a portion 54 of the coupling member is located in the path of the detent 50 on the rotatable plate 6. Engagement of the portion 54 with the detent 50 causes the coupling lever to slide on its mount 13 in the direction of the arrow C in response to actuation of the shutter opening mechanism to initiate an exposure interval. When the coupling lever 40 moves in the direction of arrow C, an edge portion 56 is moved into engagement with a lug 58 on the retaining latch 16 to move the latch out of engagement with the plate 7 to thereby actuate the shutter closing mechanism to terminate the exposure interval. Preferably the detent 58 is a rotatable eccentric to permit minor adjustments of the exposure time. Thus, when no battery is in the compartment 38 the coupling member 40 is actuated to establish a predetermined exposure time which is a function of the inherent time lag required for the rundown operation of the shutter mechanisms.

The invention has been described in detail with particular reference to preferred embodiments thereof, but it will be understood that variations and modifications can be effected within the spirit and scope of the invention.

I Claim:

1. In a camera including an energizable photoelectric shutter-control system for terminating an exposure interval a period of time after initiation thereof, the period of time being established by the control system as a function of the level of scene illumination, the improvement comprising:
    a. actuatable means for terminating an exposure interval independently of the control system a predetermined time after initiation thereof;
    b. means for sensing whether the control system is energized; and
    c. means associated with said sensing means for actuating said independent terminating means when the control system is not energized.

2. In a camera including a battery-energizable, photoelectric shutter-control system for terminating an exposure interval a period of time after initiation thereof, the period of time being established by the control system as a function of the level of scene illumination, the improvement comprising:
    a. actuatable means for terminating an exposure interval independently of the control system a predetermined time after initiation thereof;
    b. means for sensing whether the control system is energized by a battery; and
    c. means associated with said sensing means for actuating said independent terminating means when the control system is not energized by a battery.

3. In a photographic camera including a shutter mechanism for initiating and terminating an exposure interval, a battery-operable photoelectric shutter-control system for terminating an exposure interval a period of time after initiation thereof, the period of time being established by the control system as a function of the level of scene illumination, and a receptacle for receiving a battery for energizing the control system, the improvement comprising:
    a. actuatable means for terminating an exposure interval independently of the control system a predetermined time after initiation thereof;
    b. a sensing arm extending into the battery receptacle for sensing the presence and absence of a battery therein; and
    c. means associated with said sensing means for actuating said independent terminating means when there is no battery in the battery receptacle.

4. In a photographic camera including a shutter mechanism for initiating and terminating an exposure interval, a receptacle for receiving a battery, and an electromagnetic transducer energizable by a battery in the receptacle and actuatable to actuate the shutter mechanism to terminate an exposure interval, the improvement comprising:
    a. actuatable means for terminating an exposure interval independently of the electromagnetic transducer a predetermined time after initiation thereof;
    b. means for sensing the presence and absence of a battery in the battery receptacle; and
    c. means associated with said sensing means for actuating said independent terminating means when there is no battery in the battery receptacle.

5. In a camera including a shutter-opening mechanism for initiating an exposure interval, a shutter-closing mechanism for terminating the exposure interval, a battery-energizable photoelectric shutter-control system for actuating the shutter-closing mechanism to terminate an exposure interval a period of time after initiation thereof, the period of time being established by the control system as a function of the level of scene illumination, and a receptacle for receiving a battery for energizing the control system, the improvement comprising:

a. actuatable means for actuating the shutter-closing mechanism independently of the control system for terminating an exposure interval a predetermined time after initiation thereof;

b. means for extending into the battery receptacle sensing the presence and absence of a battery therein; and c. means associated with said sensing means for actuating said independent terminating means when the sensing means detects the absence of a battery in the receptacle.

* * * * *